(12) United States Patent
Stacey et al.

(10) Patent No.: US 9,366,856 B2
(45) Date of Patent: Jun. 14, 2016

(54) APPARATUS AND METHODS FOR COMBINING AND SEPARATING MULTIPLE BEAMS

(71) Applicant: BAE SYSTEMS plc, London (GB)

(72) Inventors: Craig Daniel Stacey, South Gloucestershire (GB); Christopher Stace, South Gloucestershire (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/410,286

(22) PCT Filed: Jun. 21, 2013

(86) PCT No.: PCT/GB2013/051638
§ 371 (c)(1),
(2) Date: Dec. 22, 2014

(87) PCT Pub. No.: WO2013/190323
PCT Pub. Date: Dec. 27, 2013

(65) Prior Publication Data
US 2015/0338640 A1   Nov. 26, 2015

(30) Foreign Application Priority Data
Jun. 23, 2012  (GB) .................................. 1211296.7

(51) Int. Cl.
*G02B 26/08* (2006.01)
*G02B 27/30* (2006.01)
(Continued)

(52) U.S. Cl.
CPC ............ *G02B 26/08* (2013.01); *G02B 6/29373* (2013.01); *G02B 26/0816* (2013.01);
(Continued)

(58) Field of Classification Search
CPC ............. G02B 6/2931; G02B 6/29313; G02B 27/1086; G02B 6/3512; G02B 6/3514; G02B 6/3528
USPC .............................................. 359/223.1–226.1
See application file for complete search history.

(56) References Cited

U.S. PATENT DOCUMENTS 5,594,744 A * 1/1997 Lefevre ................. H01S 3/0812
372/102
2003/0147142 A1   8/2003 Biswas et al.
(Continued)

FOREIGN PATENT DOCUMENTS

DE   241508 A1   9/1985
GB   2430761 A   4/2007
(Continued)

OTHER PUBLICATIONS

International Search Report and Written Opinion received for Patent Application No. PCT/GB2013/051638, mailed on Sep. 23, 2013. 15 pages.
(Continued)

*Primary Examiner* — Euncha Cherry
(74) *Attorney, Agent, or Firm* — Finch & Maloney PLLC

(57) ABSTRACT

A method of combining and co-aligning a plurality of radiation beams each having a respective waveband, includes the steps of passing each of said radiation beams to a respective lateral deflector to impart a selected lateral displacement to said beam. Each of said radiation beams with respective imparted lateral displacements is then passed to an optical collimating element which passes said radiation beams to an optical deflecting element which applies a wavelength dependent deflection to the radiation beams. The respective lateral displacements are selected having regard to the waveband of each beam to cause all to exit the optical deflecting element at the same angle so they are co-aligned.

14 Claims, 3 Drawing Sheets

(51) Int. Cl.
*G02B 6/293* (2006.01)
*G02B 27/10* (2006.01)
*G02B 27/12* (2006.01)

(52) U.S. Cl.
CPC ........ *G02B26/0833* (2013.01); *G02B 26/0875* (2013.01); *G02B 27/1006* (2013.01); *G02B 27/126* (2013.01); *G02B 27/30* (2013.01)

(56) References Cited

U.S. PATENT DOCUMENTS

| | | |
|---|---|---|
| 2007/0230865 A1 | 10/2007 | Dames et al. |
| 2008/0240649 A1 | 10/2008 | Korevaar et al. |
| 2009/0223072 A1 | 9/2009 | Morin et al. |
| 2012/0236247 A1 | 9/2012 | Yuan et al. |

FOREIGN PATENT DOCUMENTS

| | | |
|---|---|---|
| JP | S62284323 A | 12/1987 |
| JP | 2011145462 A | 7/2011 |
| WO | 2013190323 A1 | 12/2013 |

OTHER PUBLICATIONS

GB Intellectual Property Office Search Report under Section 17(5) received for GB Patent Application No. 1211296.7, mailed Oct. 24, 2012. 5 pages.

Bochove, Erik, J., "Theory of Spectral Beam Combining of Fiber Lasers," IEEE Journal of Quantum Electronics, vol. 38, No. 5. May 2002. 14 pages.

International Preliminary Report on Patentability and Written Opinion received for Patent Application No. PCT/GB2013/051638, mailed on Dec. 31, 2014. 9 pages.

\* cited by examiner

APPARATUS AND METHODS FOR COMBINING AND SEPARATING MULTIPLE BEAMS

This invention relates to apparatus and methods for combining multiple beams, to apparatus and methods for separating a beam into multiple components and to apparatus and methods for beam steering. In particular, but not exclusively, this invention relates to apparatus and methods for handling multiple laser beams, typically over extended wave ranges.

There is often a need to combine and co-align lasers of different wavelengths, for example in remote spectroscopy or in optical communication, and likewise a need to separate incoming wavefronts containing several wavelengths into their component wavelengths. The traditional way of combining and co-aligning is to use dichroic mirrors, which when aligned correctly reflect certain wavelengths and transmit other wavelengths, depending on the design of the dichroic. However, as the number of wavelengths to be combined and the spectral range of these wavelengths increase, the more complex the design of the dichroic becomes, and the more dichroic mirrors themselves are potentially needed. This problem is compounded by the alignment tolerances of each dichroic and the escalating cost as additional wavelengths are introduced.

An alternative solution is spectral beam combining (SBC). In this approach, the radiation from a number of spatially separated laser sources is collected, and collimated by a common optic (or mirror), which translates spatial separation in the lens/mirror focal plane (i.e., at the laser sources) into angular separation in the image plane. A diffractive optical element (DOE) of some description (usually a grating) is then placed following the lens, upon which the different wavelength beams are incident at different angles. The DOE is selected and oriented so that the transmitted (or reflected, depending on the DOE type) beams are each deflected/reflected through the appropriate respective angle to be co-aligned (ie to compensate for the angular separation caused by the spatial separation of the input beams). This technique is described for example in C. C. Cook and T. Y. Fan, OSA Trends in Optics and Photonics, M. M. Fejer, et al, Eds., 1999, vol. 26, Advanced Solid State Lasers, pp 163-166 and Erik J. Bochove, "Theory of Spectral Beam Combining of Fiber Lasers", IEEE Jn. Of Quant. Elect. Vol. 38, No. 5, May 2002.

Such approaches have been used to combine and co-align fibre lasers and diode lasers. However, a constraint with this grating-based approach is that the input sources have to be very close in wavelength, typically nanometers or less due to the restricted spectral range achievable with a grating. Our studies have suggested that a wavelength range of more than 1 μm around visible and/or near infrared wavelengths cannot be achieved efficiently with simple grating designs.

Some existing proposals have an array of inputs, in which each input (e.g., a fibre, waveguide, or laser) is in a fixed position. This constrains the allowable wavelengths which can be efficiently combined, since a given input position will result in a unique angle of incidence (AOI) on the DOE, and therefore a certain output angle from the DOE, determined by the AOI and the wavelength of the beam. Therefore, in current approaches, the wavelength of each input is tuned such that each of the beams is deflected by the respective appropriate amount so that a co-aligned beam results. However, it may be desirable, with a fixed array of inputs, to adjust the wavelengths or indeed introduce new wavelengths via additional or existing inputs for other operational reasons. To ensure that the beams remain co-aligned on exit from the DOE, one approach is to move the fibre/waveguide inputs, for example through electrostatic actuation, as described in WO2004/109350. However, there are a number of limitations with this approach; the separation between fibres is necessarily larger than the fibre diameter, in order to accommodate the electrodes; reasonably high voltages are required in order to hold the fibre in a particular position (perhaps tens to hundreds of Volts per fibre) making the overall device active during use, and the fibre is vulnerable to movement even when "fixed" by a certain voltage.

SUMMARY OF THE INVENTION

Accordingly, in one aspect, this invention provides apparatus for co-aligning a plurality of input radiation beams each having a respective waveband, which includes:
  a plurality of respective lateral deflectors to impart in use a selected respective lateral displacement to each input beam,
  an optical collimating element for receiving each of said radiation beams with respective imparted lateral displacements,
  an optical deflecting element for receiving each of said radiation beams passed by said optical collimating element,
  wherein said respective lateral displacements are selected having regard to the waveband of each beam to cause the radiation passed by said optical deflecting element to be co-aligned.

In this arrangement, the various lateral deflections imparted to the beams ensure that the resultant respective deflection applied to each beam by the optical deflecting element causes all the beams to exit the optical deflecting element at the same angle, to ensure co-alignment of all the beams. Preferably the plurality of input radiation beams are parallel, for example delivered by a parallel array of waveguides and/or fibres.

In another aspect, there is provided a method of co-aligning a plurality of input radiation beams each having a respective waveband, which includes the steps of:
  passing each of said input radiation beams to a respective lateral deflector to impart a selected lateral displacement to said beam,
  passing each of said radiation beams from its respective lateral deflector to an optical collimating element which passes said radiation beams to an optical deflecting element,
  wherein said respective lateral displacements are selected having regard to the waveband of each beam to cause the radiation beams passed by said optical deflecting element to be co-aligned.

In the above aspects, the lateral displacement may be zero in some instances, so that the beam passes through one or more lateral deflectors without deviation. Also the term 'waveband' is used to include the possibility of monochromatic light such as laser radiation, as well as sources or a combination of sources that emit a range of wavelengths.

Preferably the lateral deflector includes an element mounted for angular movement and adapted to impart at least a component of lateral displacement to said beam. Thus in one arrangement the deflecting element may comprise a window element or the like of transmissive material through which said radiation beam passes. The element of transmissive material conveniently comprises spaced parallel planar inlet and outlet surfaces whereby a lateral displacement is imparted to a beam passing therethrough of magnitude dependent on the angle of incidence of the beam on the inlet surface. Alternatively the deflecting element may comprise a reflecting surface on which said beam is incident, the reflecting surface being mounted for angular movement about an axis spaced from an axis of said beam whereby movement of said reflecting element imparts a component of lateral displacement to said beam in addition to an angular deflection.

The optical collimating element may comprise a mirror or a lens, lens system, or other suitable optical component.

Advantageously, said optical deflecting element is adapted to apply a wavelength-dependent angular deflection to said beam. The optical deflecting element may comprise a prism. The use of a prism compared to a diffractive optical element such as a grating provides a number of benefits; there are no higher diffractive orders that remove power from the main beam, and for effective angular movement a much broader spectrum can be utilised than with a grating. However in certain applications these considerations may be of lesser importance and so a diffractive optical element may be used in some applications, and the invention extends to such devices.

Conveniently, said lateral deflector element may include a micro electro-mechanical system (MEMS) for effecting angular movement thereof.

In another aspect this invention provides a method for separating an input field of radiation containing a plurality of wavebands into spaced beams, which includes the steps of:

passing the input field to an optical deflector for deflecting said field to pass a plurality of beams to an optical focussing element and thence to a plurality of respective lateral deflectors to impart a selected respective lateral displacement to the beams passing from said optical focussing element, the respective lateral displacements being selected having regard to the wavebands contained in the input beam to cause separation into a plurality of spaced output beams each of a respective waveband.

Preferably the spaced output beams are parallel. Conveniently the output beams may pass to respective waveguides, fibres, sensors or a combination thereof.

In yet another aspect, this invention provides apparatus for separating an input radiation field containing different wavebands into spaced output beams each having a respective waveband, which includes:

an optical deflector for receiving and deflecting said input field into a plurality of deflected beams;

an optical focussing element for receiving said deflected radiation beams from said optical deflector, and a plurality of respective lateral deflectors to impart a respective selected lateral displacement to the deflected radiation beams thereby to separate said co-aligned plurality of beams into spaced separate beams each of a given waveband.

In yet another aspect, this invention provides a beam steering apparatus for steering a beam of radiation which comprises:

a lateral deflector for imparting a selected lateral displacement to said radiation beam, and a collimating optical element, wherein said lateral deflector is adjustable to impart an adjustable lateral displacement to the beam to cause the axis of the beam passing said optical collimating element to be correspondingly angularly adjusted.

This may be used to direct a transmitted beam, or to direct the angle of acquisition of an incoming beam.

In yet another aspect this invention provides a method of steering a beam of radiation which comprises:

passing said beam of radiation to a lateral deflector to impart a selected lateral displacement to said beam and passing said laterally displaced beam to a collimating lens, and adjusting the lateral deflector to impart an adjustable lateral displacement to the beam to cause the axis of the beam passing said optical collimating element to be correspondingly angularly adjusted.

As above the method may be used in reverse to steer the angle of acquisition of an incoming beam.

Thus in another aspect this invention provides a directional receiver for angularly deflecting a detection beam, which comprises a focussing element for receiving a radiation beam along a line of sight, and a lateral deflector for receiving the beam passed by said focussing element, wherein said lateral deflector is adjustable to apply a selected lateral displacement to said beam, whereby the line of sight of said receiver varies according to the extent of lateral displacement applied to said beam.

The invention also extends to a method for angularly deflecting a detection beam having a line of sight, which comprises passing said detection beam through a focussing element, and applying an adjustable lateral deflection to said beam to cause the line of sight of the deflection beam to be angularly adjusted.

The various preferred features relating to the components included in the first mentioned aspects such as the lateral deflector, the collimating element and the optical deflecting element may be incorporated individually or severally into the latter aspects.

Whilst the invention has been described above, it extends to any inventive combination or sub-combination of the features set out above or in the following description or claims.

The invention may be performed in various ways, and, by way of example only, various embodiments will be described in detail, reference being made to the accompanying drawings in which.

Figure 1:
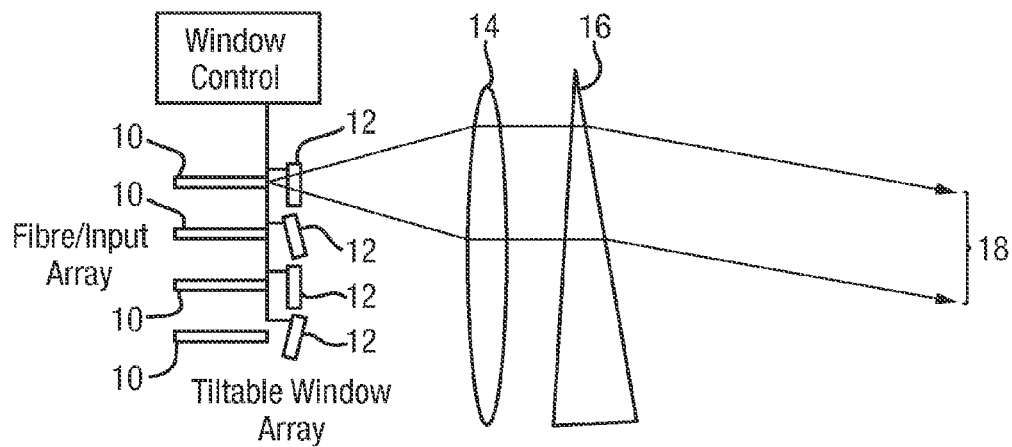
FIG. 1 is a schematic view of a broadband optical collimator in accordance with this invention.
Figure 2:
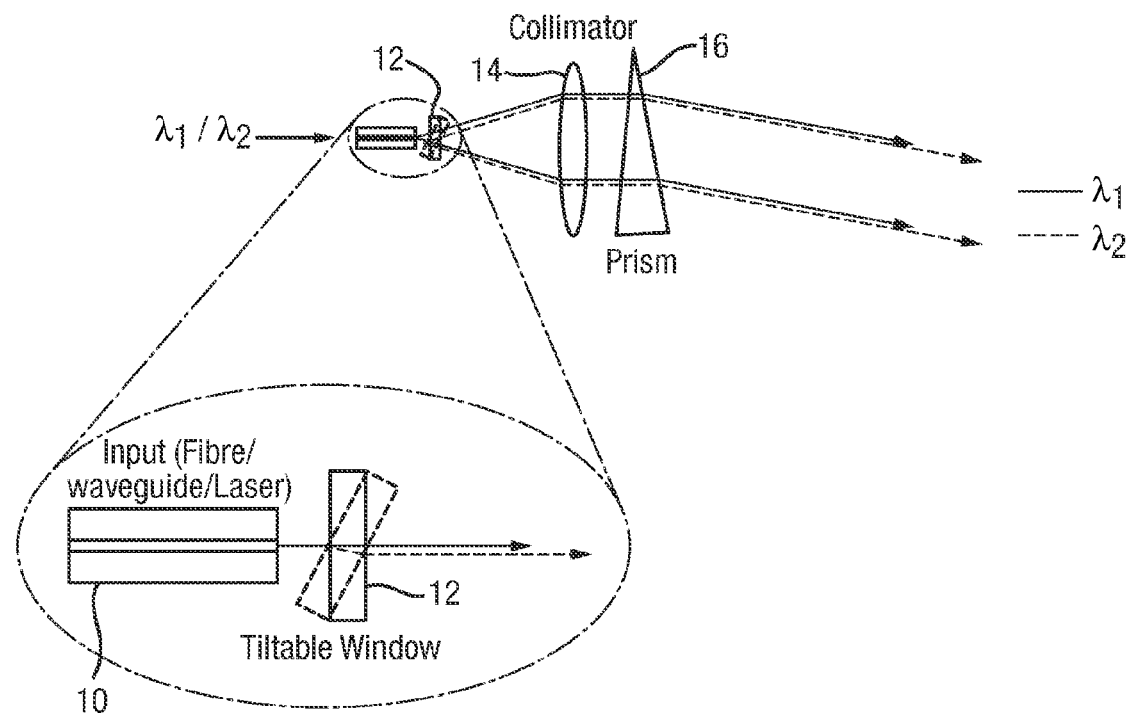
FIG. 2 is a view of a single input beam and its passage through the components of the embodiment of FIG. 1 showing the lateral offset experienced by a beam of a different wavelength.
Figure 3A:
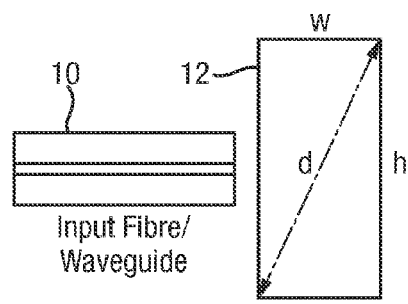
Figure 4:
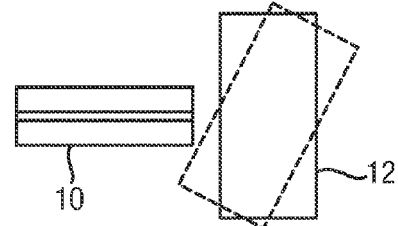
Figure 5:
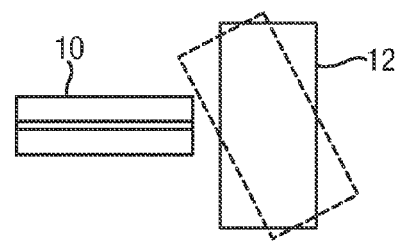
Figure 5:
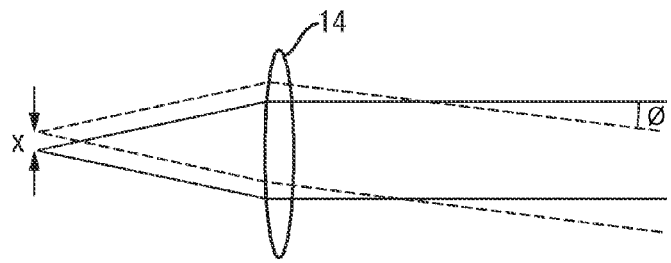
Figure 6:
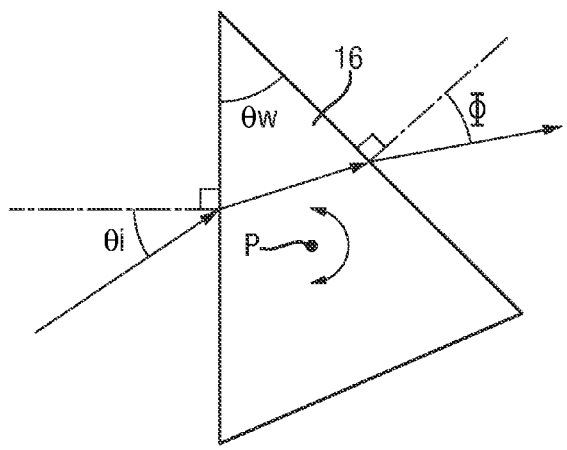
Figure 7:
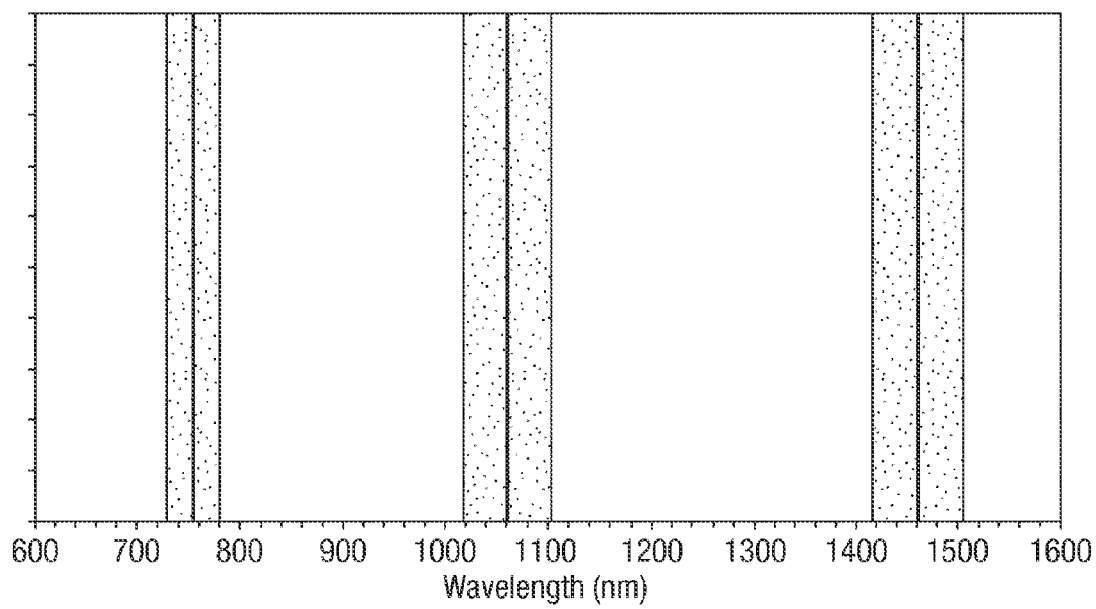
Figure 8:
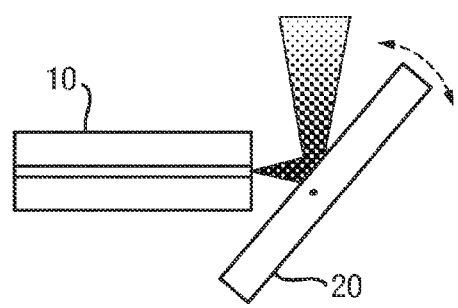
Figure 9:
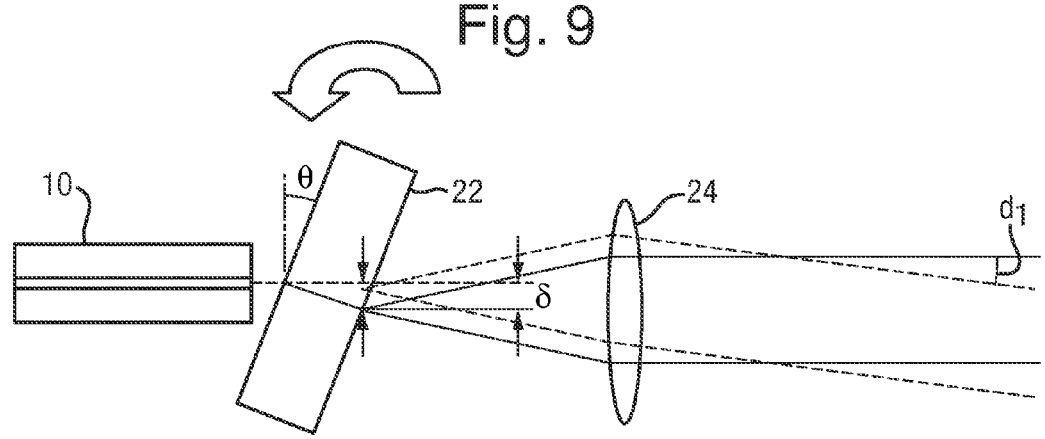

FIGS. 3(a) and (b) are views of an individual input fibre/wave guide and associated tiltable window with the window in a neutral, non-displacing and a tilted, displacing position respectively;

FIG. 4 is a detail view of two adjacent input fibres/wave guides showing the adjacent windows with tilts which bring the opposed facing vertices of the windows to their closest proximity;

FIG. 5 is a diagram showing the angular deflection of a collimated beam arising from a lateral displacement of the input fibre/wave guide;

FIG. 6 is a schematic view of a prism showing the deflection imparted to a beam passing therethrough and identifying the input, output and prism wedge angles;

FIG. 7 is a graph showing wavelengths that can be combined and co-aligned in a collimator of the type shown in FIG. 1 with fibres spaced at 250 µm, with each wavelength overlaid with a band indicating the spread of wavelengths permitted by an operating range of tilt angles of the tiltable windows;

FIG. 8 is a schematic view of a tiltable mirror for use in another embodiment of the invention, and FIG. 9 is a schematic view of an embodiment of a beam steering device in accordance with this invention.

Referring initially to the embodiment illustrated in FIG. 1, an aligned array of fibres or waveguides 10 or a combination thereof pass individual parallel input beams each of a different wavelength through an array of tiltable windows 12, the beams then passing through a collimating lens 14 and then a prism 16 whose characteristics will be described in more detail below, to give an output beam 18 in which the individual input beams are collimated and co-aligned.

In the array of tiltable windows 12, each window 12 of the array covers an individual fibre/waveguide input. The effect of this will be to impose on each input beam a respective lateral beam displacement δ, the extent of which is proportional to the degree of tilt θ of the window (FIG. 3(*b*)), as then the beam exiting the window is parallel to that laterally displaced from the beam entering the window. Each lateral beam displacement δ may be considered to 'reverse' the effect of changing the wavelength on a fixed-position input. The smallest wavelength separation of an SBC system of the type described above will primarily be dependent on the physical separation of the inputs, which is determined by mechanical constraints, but mainly the diameter of the input (e.g., the outer diameter of a fibre, or the cladding diameter of a waveguide). This therefore places a limit on the wavelengths which can be combined. However, through the use of tiltable windows 12, a degree of spectral freedom is opened up on each input. By having a sufficient number of inputs, and sufficient tilt θ available to the windows 12, this may allow an extremely broad band of laser wavelengths to be combined and co-aligned compared to existing proposed devices.

The array of input fibres 10 ideally should accommodate as many fibres as practically possible, and position them as close as possible to each other. Suitable known systems for maintaining the fibres in an ordered array include v-groove arrays, machined from various materials, including silicon, quartz, glass and ceramics (www.moritexusa.com, www.ozoptics.com). A typical example of an off-the-shelf version is designed for 125 µm fibre diameters. The v-grooves are designed to provide a fibre-to-fibre separation ('pitch') of typically 250 µm, while arrays can currently be specified with up to 48 v-grooves. We consider a 250 µm pitch array as the input in one embodiment. For simplicity and proof of principle, we consider three fibres within the array, separated by the pitch, although clearly in practice the arrays will contain many more fibres, and indeed many different array pitches and fibre diameters can be used.

The array of windows 12 may comprise a MEMS (micro electro-mechanical system) type device which consists of a micro-actuator or hinge, onto which is mounted a micro-window. Such systems may be realised using current MEMS and precision optical engineering techniques. An example of a tiltable micro-window array can be seen in U.S. 2012/0086999.

Figure 3B:
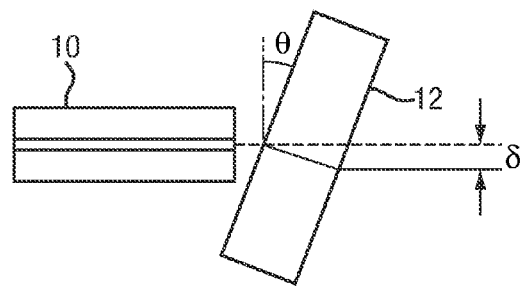

The geometric considerations would clearly require the height (h) or width of the windows 12 to be less than the pitch of the fibres 10 in the input array (see FIG. 3(*a*)). There would also be a further margin in order to allow tilt of the windows 12 without mechanical interference from the neighbouring windows. FIG. 4 shows two windows 12, with tilts which bring the vertices to their closest proximity. The height (h) of the window is therefore limited by the thickness (w), and the condition for suitably separating the windows is that window-axes are separated by a distance greater than the diagonal, d, which is a function of h and w (FIG. 3(*a*)). For a window thickness of 100 µm and the aforementioned fibre pitch of 250 µm a suitable window height, h, would be 225 µm.

The lateral displacement caused by tilting a window 10, δ, is given by:

$$\delta = w\sin\theta\left[1 - \frac{\cos\theta}{\sqrt{n^2 - \sin^2\theta}}\right] \quad (1)$$

where θ is the tilt angle of the window and n is the refractive index of the window material (FIG. 3 (*b*)). For a magnesium fluoride window, which has a refractive index of 1.38 at a wavelength of 1060 nm, it is apparent that a tilt of +/−45°, will result in a beam displacement of +/−28.5 µm from the optical axis.

In the present embodiment, an achromatic spherical doublet lens 14 is used as a collimating element, with a nominal focal length of 100 mm. The angular deflection, φ, on the beam exiting the lens, resulting from a lateral displacement from the optical axis in the focal plane is illustrated in FIG. 5 and is described by equation (2):

$$\phi = \arctan\left(\frac{x}{f}\right) \quad (2)$$

where x is the displacement at the focal plane, and f is the lens focal length.

From equation (2) therefore, it is apparent that a displacement of +/−28.5 µm will, with a 100 mm focal length lens, produce a beam deflection following the lens of +/−0.285 mrad.

Located beyond (i.e., away from the fibre inputs) the lens 14 is the wedge prism 16. In the current embodiment, this is assumed to have a diameter similar to the lens, to have a wedge angle of 20° and be made from sapphire. The wedge prism 16 will impose a further angular deflection to the beam, the extent of which being dependent upon i) the AOI onto the input face of the prism, and ii) the wavelength. This can be described by the following equation:

$$\Phi = \arcsin[\sin\theta_i \cos\theta_w - n(1-(\sin^2\theta_i/n^2))^{0.5}\sin\theta_w] \quad (3)$$

where Φ is the propagation angle relative to the output face normal of the prism, $\theta_w$ is the apex angle of the wedge prism, $\theta_i$ is the AOI onto the prism input face (relative to its normal), and n is the refractive index of the prism, as illustrated in FIG. 6.

For the purposes of this embodiment, we design for an output angle Φ of 0.3 rad. This therefore determines the incident angle requirements for each wavelength of interest, which in turn determines the requirements on input fibre separation through equation (2). For a sapphire prism, having refractive index of 1.76 at 1 µm wavelength, it is possible to calculate therefore what level of spectral separation would be possible from two fixed fibres 10 spatially separated by 250 µm for a given prism 16. For this embodiment, we assume a configuration designed for one fibre (fibre#1) emitting at 1060 nm, on axis; the prism is then rotated about an axis P (FIG. 6) perpendicular to the beam such that the AOI of the 1060 nm beam is such that a collimated beam at 0.3 rad to the prism output face normal results. For the neighbouring fibre (fibre#2), 250 µm away from fibre#1, it is a straightforward process to calculate the wavelength which will form an output beam from the prism which is co-aligned with the beam from fibre#1 (i.e., exiting the prism at 0.3 rad). Equation (3) can be used for this purpose, setting Φ to be 0.3, and $\theta_i$ to be equal to φ from equation (2). Equation (3) can then be solved for n, which is a function of wavelength. A plot of the dispersion curve for sapphire will thus produce the wavelengths which correspond to the fibre separation. In this case, it can be determined that in this particular example, a separation of +/−250 μm between fibres will mean that, for the beams to be co-aligned at the output of the prism, the input beams need to be at wavelengths of 755 nm and 1460 nm respectively.

Using the same process as that aforementioned, one can derive the corresponding wavelengths for the given beam displacements caused by micro-window tilts. For fibre#1, emitting at 1060 nm, a +/−45° tilt (producing a +/−28.5 μm beam displacement) will correspond to a wavelength range of 1017 nm to 1103 nm, i.e., +/−43 nm. For the neighbouring fibres at 250 μm from fibre#1, the wavelength ranges are 730 nm to 782 nm, and 1414 nm to 1506 nm. This effect is shown graphically in FIG. 7.

Clearly, a thicker window will produce a greater beam deflection for a given tilt angle θ, which will, in turn, broaden the spectral range of each fibre in FIG. 7, but this will require a decrease in the window height, h, in order to permit mechanical clearance between windows; however, this trade-off will be driven by the expected beam divergence from the fibres/waveguides, and whether the windows are overfilled by the laser radiation or not.

Other materials may be preferable for the micro-windows, e.g., those that have higher dispersion and would hence produce greater beam displacement for a given tilt. Examples include sapphire or spinel.

A slightly different architecture, which would perform the equivalent function, would be to have tiltable mirrors 20 in place of transmissive windows, as illustrated in FIG. 8. If such a mirror 20 is mounted such that its axis of rotation is misaligned from the fibre/waveguide optical axis, then the beam will be displaced, as the mirror is tilted (as well as angularly deflected, although angular deflection will have negligible effect as far as the overall concept is concerned). There may be engineering benefits in realising such architectures, such as constraints on the clearances of the MEMS substrate upon which the mirrors or windows are mounted.

Also in certain applications the prism 16 in the embodiment of FIG. 1 may be replaced by a diffractive optical element such as e.g. a grating which applies a wavelength dependent angular deflection to radiation incident thereon.

Since, for a fixed wavelength, the tilt of the window causes an angular deflection of the beam exiting the DOE/collimating system, a further application of this approach is beam steering for single laser wavelength systems. This may be used where accurate pointing of a beam is required (for example beam scanning, material marking, laser projectors), or where, in the case where atmospheric perturbation over long distances requires correction of the beam pointing in order to maintain optical energy on a target.

Thus referring to FIG. 9, a beam steering device may comprise a tiltable window 22 (or mirror) through which the input beam passes before passing through a collimating component 24 such as a lens or mirror. The window 22 applies an adjustable lateral displacement to the beam which is converted into an angular displacement of the collimated beam as explained in relation to FIGS. 3(*b*) and 5 in the previous embodiment. Thus the collimated beam may be steered by adjusting the amount of lateral displacement applied to the beam before the collimating lens.

It will of course be appreciated that the various embodiments described above may equally be used in reverse as a beam separator for separating an optical input field containing a plurality of wavelengths back into individual component beams, and the invention extends to apparatus and methods for beam separating using this architecture.

Furthermore, the device in reverse may operate as a selective comb filter, to split an incoming field into particular wavelength components, with the lateral deflectors being adjusted to control which wavelengths are incident on the output fibres or waveguides (equivalent to the input fibres or waveguides in FIG. 1), or on sensors disposed in their place.

In some applications, the individual window or mirror elements may be individually adjusted and locked in their individual positions prior to full operation of the device so that the device operates as a passive device. As and when new wavelengths are required to be processed the windows or mirrors may be adjusted to provide co-alignment and then locked again in a resetting routine. Alternatively the device may be an active device which allows the mirrors or windows to be adjusted dynamically during operation of the device as the wavelength of the input beams is altered, or in the reverse operation to tune the beam separator to selectively adjust the wavelengths passed or separated by the device.

The invention claimed is:

1. Apparatus for co-aligning a plurality of input radiation beams each having a respective waveband, which includes:
   a plurality of respective lateral deflectors, each of the respective lateral deflectors configured to impart a selected respective lateral displacement to a corresponding one of the input radiation beams;
   an optical collimating element for passing each of said radiation beams with respective imparted lateral displacements; and
   an optical deflecting element for receiving the radiation beams passed by said optical collimating element;
   wherein said respective lateral displacements are selected having regard to the waveband of each beam to cause the radiation passed by said optical deflecting element to be co-aligned, and
   wherein the optical collimating element is disposed between the optical deflecting element and at least one of the lateral deflectors.

2. Apparatus according to claim 1, wherein said lateral deflector includes an element mounted for angular movement and adapted to impart at least a component of lateral displacement to said beam.

3. Apparatus according to claim 2, wherein said optical deflecting element comprises an element of transmissive material through which said radiation beam passes.

4. Apparatus according to claim 3, wherein said element of transmissive material comprises spaced parallel planar inlet and outlet surfaces whereby a lateral displacement is imparted to a beam passing therethrough.

5. Apparatus according to claim 2, wherein said optical deflecting element comprises a reflecting surface on which said beam is incident, the reflecting surface being mounted for angular movement about an axis spaced from an axis of said beam whereby movement of said reflecting element imparts a component of lateral displacement to said beam.

6. Apparatus according to claim 1, wherein said optical collimating element comprises a mirror.

7. Apparatus according to claim 1, wherein said optical collimating element comprises a lens or lens system.

8. Apparatus according to claim 1, wherein said optical deflecting element is adapted to apply a wavelength-dependent angular deflection to said beam.

9. Apparatus according to claim 8, wherein said optical deflecting element comprises a prism.

10. Apparatus according to claim 8, wherein said optical deflecting element comprises a diffractive optical element.

11. Apparatus according to claim 1, wherein said lateral deflector element includes a MEMS device for effecting angular movement thereof.

12. A method of co-aligning a plurality of input radiation beams each having a respective waveband, which includes:
   passing each of said input radiation beams to a respective one of a plurality of lateral deflectors corresponding to one of the input radiation beams, each of lateral deflectors being configured to impart a selected lateral displacement to said radiation beam; and
   passing each of said radiation beams with respective imparted lateral displacements to an optical collimating element which passes said radiation beams to an optical deflecting element;
   wherein said respective lateral displacements are selected having regard to the waveband of each beam to cause the radiation beams passed by said optical deflecting element to be co-aligned, and
   wherein the optical collimating element is disposed between the respective lateral deflector and the optical deflecting element.

13. A beam steering apparatus for steering a beam of radiation, the beam steering apparatus comprising:
   a lateral deflector for imparting a selected lateral displacement to said radiation beam;
   an optical collimating element configured to pass the laterally displaced radiation beam; and
   an optical deflecting element for receiving the radiation beam passed by the optical collimating element;
   wherein said lateral deflector is adjustable to impart an adjustable displacement to the beam to cause the axis of the beam passing said optical collimating element to be correspondingly angularly adjusted, and
   wherein the optical collimating element is disposed between the lateral deflector and the optical deflecting element.

14. A directional receiver for angularly deflecting a detection beam, the directional receiver comprising:
   a focussing element configured to receive a radiation beam along a line of sight;
   a lateral deflector configured to receive the beam passed by said focussing element;
   an optical collimating element for passing the radiation beam; and
   an optical deflecting element for receiving the radiation beam passed by the optical collimating element;
   wherein said lateral deflector is adjustable to apply a selected lateral displacement to said beam, whereby the line of sight of said receiver varies according to the extent of lateral displacement applied to said beam, and
   wherein the optical collimating element is disposed between the lateral deflector and the optical deflecting element.

* * * * *